Dec. 26, 1939.   C. C. FARMER   2,184,549
SPEED CONTROLLED BRAKE
Filed Feb. 19, 1938
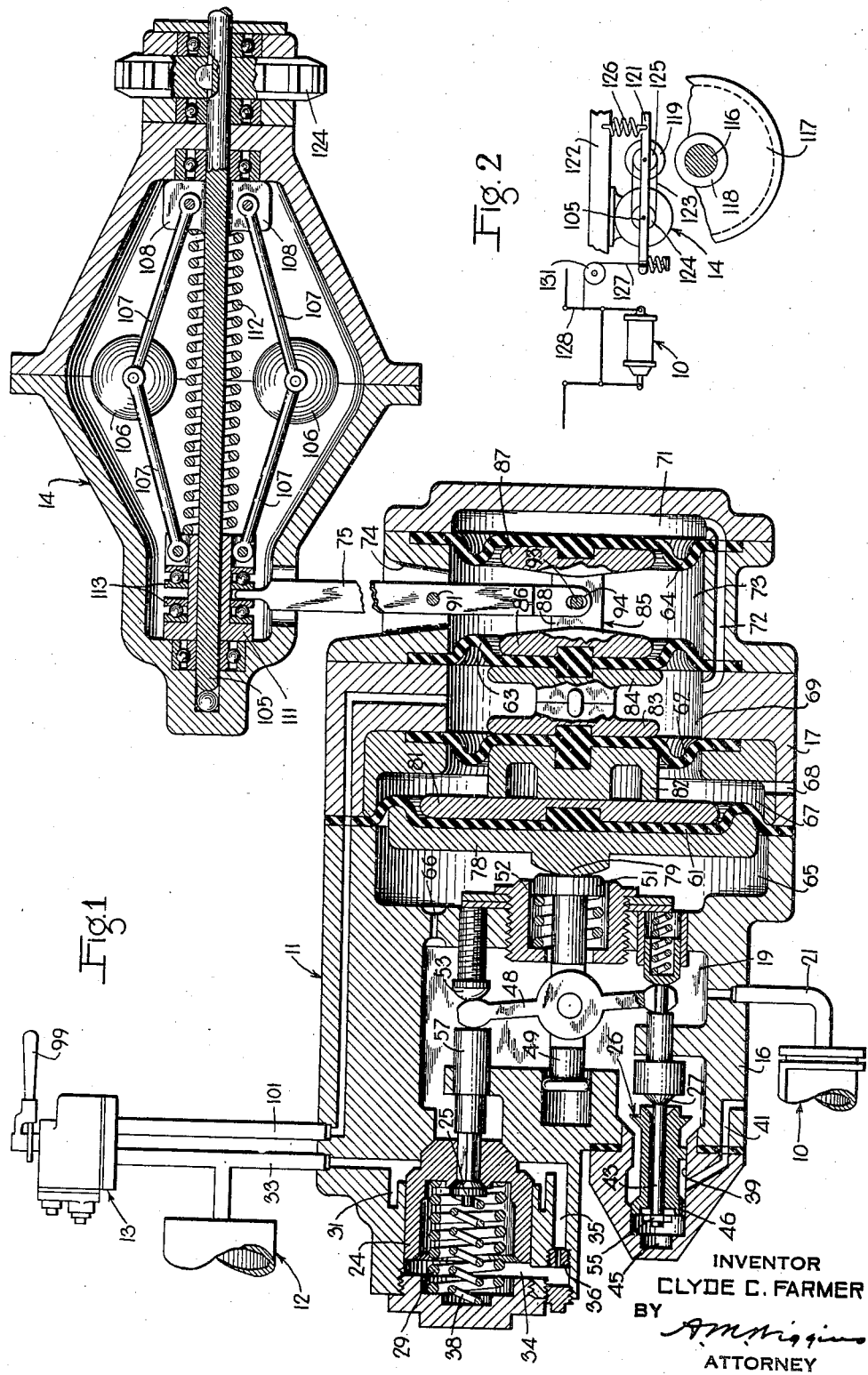
INVENTOR
CLYDE C. FARMER
BY
A. M. Higgins
ATTORNEY Patented Dec. 26, 1939

2,184,549

UNITED STATES PATENT OFFICE 2,184,549

SPEED CONTROLLED BRAKE

Clyde C. Farmer, Pittsburgh, Pa., assignor to The Westinghouse Air Brake Company, Wilmerding, Pa., a corporation of Pennsylvania Application February 19, 1938, Serial No. 191,499

5 Claims. (Cl. 303—21)

This invention relates to speed-controlled brakes and particularly to brake equipment for vehicles, such as railway cars, and trains, in which the degree of application of the brakes on the vehicle or car is varied automatically upon variations in the speed of the vehicle.

It is a fact well understood by those skilled in the art that in order to prevent the excessive application of the brakes on vehicle wheels and the consequent locking and sliding thereof, it is necessary to relieve or reduce the degree of application of the brakes as the speed of the vehicle reduces. In the case of railway cars and trains, various types of brake control equipment have been proposed for automatically reducing the degree of application of the brakes on a car as the speed reduces.

It is an object of my invention to provide a novel arrangement for automatically reducing the degree of application of the brakes as the speed of the vehicle or car reduces.

More specifically, it is an object of my invention to provide a vehicle brake equipment having a novel arrangement, including a centrifuge device driven according to the speed of the vehicle, for automatically varying the degree of application of the brakes as the speed of the vehicle varies.

The above objects, and other objects of my invention which will be made apparent hereinafter, are accomplished by means of an illustrative embodiment of my invention which will be described subsequently and which is shown in the accompanying drawing, wherein, Fig. 1 is a diagrammatic view, with parts thereof in section, of a brake equipment embodying my invention, and Fig. 2 is a diagrammatic view, showing the manner in which the centrifuge device of Fig. 1 may be operated.

Description

Referring to Fig. 1, the essential elements of a brake equipment embodying my invention include a brake cylinder 10, a relay valve device 11 for controlling the supply of fluid under pressure from a reservoir 12, hereinafter referred to as the main reservoir, to the brake cylinder 10 and the release of fluid under pressure from the brake cylinder, a self-lapping brake valve device 13 and a centrifuge device 14, both of the devices 13 and 14 being effective to cause operation of the relay valve device 11.

Considering the parts of the equipment in greater detail, the relay valve device 11 comprises a casing including a valve portion 16 and a so-called diaphragm portion 17.

The valve portion of the casing has formed therein a chamber 19, hereinafter referred to as the pressure chamber, to which the brake cylinder 10 may be constantly connected as by a pipe and passage 21. The fluid pressure in the pressure chamber 19 is controlled by a self-lapping valve mechanism essentially of the type described and claimed in Patent 2,096,491 to E. E. Hewitt. Briefly, the valve mechanism comprises a main supply valve 24 in the form of a valve piston, a so-called pilot supply valve 25 carried by the main supply valve 24, a main release valve 26, and a pilot release valve 27 associated with the main release valve 26.

The main supply valve 24 is normally urged into seated relation on a valve seat formed in the casing by a coil spring 29 and, when seated, closes communication between an annular chamber 31 at the outer seated area thereof and the pressure chamber 19. The annular chamber 31 is constantly connected to and charged with fluid under pressure from the main reservoir 12 through a supply pipe and passage 33. A chamber 34 at the back of the main supply valve 24 is connected through a passage 35 to the annular chamber 31 and a choke 36 is provided in the passage 35 for restricting the rate of flow of fluid under pressure from the annular chamber 31 to the chamber 34 for a purpose to be presently made apparent.

The pilot supply valve 25 is of the poppet type and has a fluted stem which extends slidably through a suitable bore in the main supply valve 24 into the pressure chamber 19, the pilot valve 25 being contained within the chamber 34. Normally the pilot supply valve 25 is yieldingly urged into seated relation on its associated valve seat formed on the main supply valve 24 by a coil spring 38 contained in the chamber 34 concentrically within the coil spring 29.

The main release valve 26 is of the poppet type and has a tubular stem which operates slidably in a suitable bore 39 which opens into the pressure chamber 19. The bore 39 is also open to atmosphere through an exhaust passage and port 41 and when the main release valve 26 is unseated from its associated valve seat, the pressure chamber 19 is connected to atmosphere through the exhaust passage and port 41.

The pilot release valve 27 is of the poppet type and is carried on a rod or stem 43 which extends in slidable relation through the longitudinal passage within the stem of the main release valve 26, the pilot release valve 27 being adapted to seat on the end of the main release valve 26 to close the connection between the pressure chamber 19 and a chamber 45 at the inner end of the stem of the main release valve through the central longitudinal passage in the stem of the main release valve. A restricted port 46 is provided in the stem of the release valve 26 to enable the release of fluid under pressure from the chamber 45 to atmosphere by way of the exhaust passage 41.

Operation of the valves 24, 25, 26 and 27 is effected by means of a lever 48 which is pivoted intermediate the ends thereof on a plunger 49 slidably mounted in the casing. One end of the plunger 49 is provided with a flange 51 against which a compression spring 52 acts to urge the plunger 49 in the right-hand direction, as viewed in Fig. 1.

A stop screw 53 is arranged, as shown, to be engaged by the upper end of the lever 48 as it moves in the right-hand direction so that the lower end of the lever 48, which is bifurcated and straddles a reduced portion of the shaft 43 carrying the pilot release valve 27, is urged in the right-hand direction to unseat the pilot release valve 27 from the main release valve 26. The shaft or stem 43 is provided at the end thereof within the chamber 45 with a nut 55 which engages the end of the stem of the main release valve 26 and causes shifting of the main release valve 26 away from its associated valve seat in response to movement of the shaft 43 in the right-hand direction.

Interposed between the upper end of the lever 48 and the end of the fluted stem of the pilot supply valve 25 is a spacer in the form of a short rod 57 which is slidably mounted in the casing in coaxial relation to the fluted stem of the pilot supply valve 25.

The diaphragm portion of the relay valve device 11 comprises a plurality of movable abutments or diaphragms 61, 62, 63 and 64 arranged in spaced coaxial relation with each other and in axial alignment with the plunger 49, the diaphragms being suitably clamped along the periphery thereof within the casing.

The effective pressure areas of the diaphragms 61 and 62 may have any desired ratio, such as a two-to-one ratio. The diaphragms 63 and 64 are of the same effective pressure areas and, while indicated as of substantially the same effective pressure area as the diaphragm 62, may be of different area with respect thereto.

The arrangement of the diaphragms 61, 62, 63 and 64 in the casing of the relay valve device 11 is such as to form at the outer face of the largest diaphragm 61 a chamber 65 which is constantly open to the pressure chamber 19 through a relatively large passage 66 and also to form, between the largest diaphragm 61 and the adjacent diaphragm 62, a chamber 67 which is constantly open to atmosphere through an atmospheric port 68. The arrangement of the diaphragms is further such that a chamber 69 is formed between the diaphragms 62 and 63 and also a chamber 71 at the outer face of the diaphragm 64, the two chambers 69 and 71 being in constant communication through a relatively large passage 72. A chamber 73 is formed between the two diaphragms 63 and 64 and is constantly open to atmosphere through a large opening 74 in the casing, through which opening an operating lever 75, associating the centrifuge device 14 and the relay valve device 11 is arranged to extend as presently further described.

Affixed to the outer face of the largest diaphragm 61 within the chamber 65, preferably without perforating the diaphragm, is a follower disk 78 having a rounded projection 79 which engages the flange 51 at the end of the plunger 49.

Affixed to the opposite face of the largest diaphragm 61 within the chamber 67 is another follower plate or disk 81 which is engaged by a suitable follower disk 82 affixed to the adjacent face of the diaphragm 62. A minimum spacing is thus maintained between the two diaphragms 61 and 62 and independent movement of the diaphragms is permitted.

In a similar manner, suitable follower disks 83 and 84 are affixed to the diaphragms 62 and 63, respectively, within the chamber 69 preferably without perforating the diaphragms, the two follower disks being arranged to maintain at least a minimum spacing between the diaphragms 62 and 63 and permit independent movement of the diaphragms.

Interposed between the diaphragms 63 and 64 within the chamber 73 is a spacer 85, of spool shape, having a flange 86 at one end affixed to the diaphragm 63 preferably without perforating the diaphragm, and a flange 87 at the opposite end affixed to the diaphragm 64 preferably without perforating the diaphragm, the two flanges 86 and 87 being connected by an intervening stem 88.

The lever 75 is pivoted between the ends thereof on the casing, as by a pin 91, fixed at a point within the opening 74 of the casing. The lower end of the lever 75 is bifurcated to straddle the stem 88 of the spool shaped spacer 85 and a pin 93, which extends transversely through the stem 88 and through suitable slotted openings 94 at the lower bifurcated end of the lever 75, serves to pivotally connect the lever to the stem 88.

When the outer end of the lever 75 is shifted in the right-hand direction, a force is exerted on the diaphragms urging them and accordingly the plunger 49 in the left-hand direction. In a similar manner, when fluid under pressure is supplied to the chamber 69 between the diaphragms 62 and 63, the force of the fluid pressure is exerted on the diaphragm 62 to also urge the diaphragms 62 and 61 and accordingly the plunger 49 in the left-hand direction.

Upon the shifting of the plunger 49 of the relay valve device 11 in the left-hand direction from the position shown, the lever 48 is first pivoted about its upper end in a clockwise direction to effect successive seating of the pilot release valve 27 and the main release valve 26, the upper end of the lever 48 being held between the stop screw 53 and the spacer rod 57 by the force of the spring 38 acting on the pilot supply valve 25. When the main release valve 26 is seated, further movement of the lower bifurcated end of the lever 48 is stopped and the lever 48 thereafter pivots about its lower end in a counterclockwise direction to effect unseating of the pilot supply valve 25.

Upon the unseating of the pilot supply valve 25, the main supply valve 24 is unloaded, that is the fluid under pressure in the chamber 34 is released past the pilot supply valve 25 to the pressure chamber 19. The choke 36 restricts the flow of fluid to the chamber 34 to a relatively slow rate and thus a reduction of pressure on the back side of the main supply valve, that is, unloading of the supply valve is effected.

Following the unloading of the main supply valve 24 in the manner just described, continued movement of the plunger 49 in the left-hand direction causes the spacer rod 57 to engage and unseat the main supply valve 24. Fluid under pressure is accordingly supplied from the reservoir 12 to the pressure chamber 19 and the connected chamber 65. Accordingly, the pressure of the fluid in the chamber 65 acts in the right-hand direction to oppose the force exerted in the left-hand direction. When the pressure established in the pressure chamber 19 and the chamber 65 substantially balances the force urging the plunger 49 in the left-hand direction, the spring 52 acts to shift the plunger 49 in the right-hand direction. The lever 48 is then pivoted on the plunger 49 in a clockwise direction by the force of the springs 29 and 32 which act to reseat the main supply valve and the pilot supply valve, respectively. Since the pilot release valve 27 and the main release valve 26 are both seated, the pressure established in the pressure chamber 19 is effective to maintain them seated and the rocking of the lever 48 on the plunger 49 tends to assist in maintaining the pilot release valve 27 and main release valve 26 seated.

When the plunger 49 is shifted in the right-hand direction sufficiently for the upper end of the lever 48 to reengage stop screw 53, the main supply valve 24 and the pilot supply valve 25 are again both seated and thus the supply of fluid under pressure to the pressure chamber 19 is cut off or lapped.

If the force urging the plunger 49 of the relay valve device 11 in the left-hand direction is subsequently reduced, the spring 52 becomes effective to urge the plunger 49 in the right-hand direction to a further extent toward its normal position shown in the drawing. Accordingly, since the upper end of the lever engages the stop screw 53, continued movement of the plunger 49 following lapping of the supply of fluid to the pressure chamber 19 causes the lever 48 to pivot about its upper end in a counter-clockwise direction and thus effect the unseating of the pilot release valve 27.

Upon the unseating of the pilot release valve 27, fluid under pressure from the pressure chamber 19 flows through the central longitudinal passage in the stem of the main release valve 26 to the chamber 45 at the end of the release valve and thus balances the force of the pressure in the chamber 19 tending to maintain the main release valve 26 seated so that the main release valve may thereafter be unseated with a relatively small force.

As the movement of the plunger 49 in the right-hand direction toward its normal position continues, after unseating of the pilot release valve 27, the nut 55 on the end of the rod 43 carrying the pilot release valve 27 engages the end of the main release valve 26 and thereafter the main release valve and the pilot release valve are shifted together, the main release valve being accordingly unseated. Upon the unseating of the main release valve 26, fluid under pressure is exhausted to atmosphere from the pressure chamber 19, chamber 65 and brake cylinder 10 by way of the exhaust passage and port 41.

The supply of fluid under pressure to and the release of fluid under pressure from the chamber 69 between the diaphragms 62 and 63 is under the control of the self-lapping brake valve device 13. Brake valve device 13 is of the self-lapping type, described in detail and claimed in Patent 2,042,112 of Ewing K. Lynn and Rankin J. Bush and it is accordingly deemed unnecessary to show the brake valve except in outline form. Briefly, the self-lapping brake valve 13 is so constructed that when the operating handle 99 thereof is in its normal or brake release position, fluid under pressure is exhausted from chamber 69 of the relay valve device 11 through a pipe and passage 101. When the handle 99 is shifted in a horizontal plane out of its normal or release position into a so-called application zone, fluid under pressure is supplied from the reservoir 12 through the pipe and passage 101 to the chamber 69, the pressure established in the chamber 69 corresponding to the degree to which the operating handle 99 is shifted out of its normal position. If, for any reason, the pressure in the chamber 69 tends to reduce below a value corresponding to the position of the operating handle 99, the brake valve device 13 is automatically operative to supply fluid under pressure to maintain the pressure in the chamber 69.

The centrifuge device 14 may be of any suitable construction and is illustratively shown as comprising a separable casing in which is suitably journaled, as by anti-friction bearings, a shaft 105 that is arranged to be driven according to the speed of the vehicle or train in the manner to be presently described.

Suitable centrifuge weights 106 in the form of fly-balls, are arranged to be rotated with the shaft 105 by means of suitable struts 107. All of the struts 107 are pivotally connected at one end to the weights 106, some of the struts extending in one direction along the shaft 105 and others extending in the opposite direction along the shaft 105. The opposite ends of some of the struts 107 are pivotally connected to projecting lugs 108 formed on the shaft 105 and the other struts 107 are pivotally connected at their opposite ends to a sleeve 111 which is slidable along the shaft 105.

A coil spring 112, concentrically surrounding the shaft 105 and interposed between the lugs 108 and the sleeve 111, yieldingly urges the sleeve 111 along the shaft 105 to an extreme position in engagement with the casing when the shaft 105 is not rotating or rotating at less than a certain low speed.

Upon an increase in speed of rotation of shaft 105, the weights 106 move outwardly away from the shaft 105 and thus cause the sleeve 111 to be shifted in the right-hand direction along the shaft 105, against the yielding resistance of the spring 112.

The sleeve 111 is frictionlessly connected to the outer end of the lever 75 as by two ball-bearing races 113 disposed in spaced relation in an annular recess or groove on the sleeve 111, between which is retained the end of the lever 75. Accordingly, when the sleeve 111 shifts in the right-hand direction or in the left-hand direction, it causes a corresponding shifting of the outer end of the lever 75. It will thus be apparent that since the centrifugal force urging the centrifuge weights 106 outwardly varies as the square of the speed of rotation of shaft 105, a force will be exerted on the outer end of the lever 75 tending to shift it in the right-hand direction with a force which varies as the square of the speed of the car or train according to which the shaft 105 is rotated. Thus the force with which the plunger 49 of the relay valve device 11 is urged in the left-hand direction depends, in part, upon the speed of the vehicle car or train, the force being greater at the higher speeds and lower at the lower speeds.

Since operation of the centrifuge device 14 results in the application of a force urging the plunger 49 in the left-hand direction and consequently the operation of the valve portion of the relay valve device 11 to supply fluid under pressure to the pressure chamber 19 and the connected brake cylinder 10, it is necessary to provide some automatically operative means for causing the centrifuge device 14 to be operated only during applications of the brakes. Such a mechanism is illustratively shown in Fig. 2 and includes a clutch mechanism for connecting the shaft 105 to an axle 116 of a vehicle wheel 117. As shown, a friction wheel 118 is fixed to the axle 116 and a friction wheel 119 is arranged to be moved into engagement with the wheel 118 as by a supporting rod 121 on which the wheel 119 is rotatably mounted, the rod 121 being pivoted on an extended portion of the shaft 105 of the centrifuge device 14 which is in turn suspended from a fixed part 122 of the vehicle or of the car truck.

The shaft 105 of the centrifuge device 14 is arranged to be driven according to the rotation of the friction wheel 19 as by an endless chain 123 connecting a sprocket wheel 124 fixed to the shaft 105 and a similar sprocket wheel 125 fixed to or in some manner rotatable with the friction wheel 119.

The supporting rod 121 is normally biased by a tension spring 126 connected at opposite ends to the rod 121 and the fixed part 122 of the vehicle truck to a normal position in which the friction wheel 119 is out of engagement with the friction wheel 118. The supporting rod 121 is arranged to be rocked on the shaft 105, against the yielding resistance of the spring 126, to effect frictional engagement of the two friction wheels 119 and 118 upon an application of the brakes, as by a cable 127 connected at one end to a brake operating lever 128 actuated by the brake cylinder 10 and at the opposite end, through a yielding connection, to the supporting rod 121. A pulley wheel 131, rotatably supported on the fixed part 122 of the vehicle truck, is provided for guiding and tensioning the cable 127.

The tension of the spring 126 is such that the friction wheel 119 is maintained out of engagement with the friction wheel 118 on the wheel axle 116 until the fluid pressure established in the brake cylinder 10 exceeds a certain pressure, such as fifteen or twenty pounds per square inch.

*Operation*

Assuming that the main reservoir 12 is charged to the normal pressure carried therein, as from a fluid compresor, in the usual manner and that the vehicle or train of cars is traveling along the road at a relatively high speed with the brake valve handle 99 in its brake release position, the equipment is conditioned as shown in Fig. 1. Obviously, since the pressure in the brake cylinder 10 is below that necessary to effect a driving connection between the wheel axle 116 and the shaft 105 of the centrifuge device 14, the weights 106 of the centrifuge device are not rotated, and, consequently, there is no force exerted on the outer end of the lever 75 tending to effect operation of the valve portion of the relay valve device 11.

If it is desired to effect an application of the brakes, the operator shifts the brake valve handle 99 into its application zone a desired degree. Fluid under pressure is accordingly supplied to the chamber 69 between the diaphragms 62 and 63 of the relay valve device 11, and the valve portion of the relay valve device 11 is correspondingly operated to supply fluid under pressure to the brake cylinder 10 to establish a pressure therein proportional to the pressure established in the chamber 69. Obviously, the pressure established in the brake cylinder 10 is not equal to the pressure established in the chamber 69 because of the difference in the areas of the two diaphragms 61 and 62. If, as assumed previously, the areas of the two diaphragms 61 and 62 have a two-to-one ratio, the pressure established in the brake cylinder solely as a result of the pressure established in the chamber 69 will accordingly be approximately one-half of the pressure established in the chamber 69.

However, when the pressure established in the brake cylinder 10 exceeds that necessary to effect the driving connection between the shaft 105 of the centrifuge device 14 and the wheel axle 116, the weights 106 of the centrifuge device 14 are rotated at a speed corresponding to vehicle speed and consequently a force is exerted by the centrifuge device 14 in a direction to increase or add to the force of the fluid pressure in the chamber 69 urging the plunger 49 in a left-hand direction. Obviously, the force urging the outer end of the lever 75 in the left-hand direction may be suitably amplified by having the lever arm from the pivot pin 91 of the lever 75 to the sleeve 111 of the centrifuge much longer than the lever arm from the pivot pin 91 to the point of connection of the lever 75 to the spacer 88 between the diaphragms 63 and 64. For example with a lever arm ratio of five-to-one, the application of one pound of force to the outer end of the lever 75 will cause the application of five pounds of force urging the plunger 49 in the left-hand direction.

It should be noted that the force of the fluid pressure in the chamber 69 acting on the diaphragm 63 and tending to oppose the force exerted by the centrifuge device 14 is balanced by an equal and opposite force of fluid pressure in the chamber 71 acting on the diaphragm 64, due to the connection between the chambers 69 and 71 through the passage 72. Thus, the fluid pressure established in the chamber 69 is ineffective to diminish the force exerted by the centrifuge device 14 to urge the plunger 49 of the relay valve device 11 in the left-hand direction.

It should now be apparent that the centrifuge 14 may be so designed in relation to the relay valve device 11 that, assuming a pressure of eighty pounds per square inch to be established in chamber 69 at a predetermined high speed such as one hundred miles per hour, the force exerted by the centrifuge will assist the pressure of the fluid in the chamber 69 to urge the plunger 49 in the left-hand direction to such an extent that a fluid pressure of eighty pounds per square inch will be established in the brake cylinder instead of the forty pounds per square inch which would result due solely to the effect of the pressure established in the chamber 69.

The parts may be so designed that as the speed of the vehicle or train reduces due to the application of the brakes, the force exerted by the centrifuge device 14 reduces according to the square of the vehicle speed. It will thus be apparent that when the vehicle has reduced to one-half the speed at the time the application of the brakes was initiated, the force exerted by the centrifuge urging the plunger 49 of the relay valve device in the left-hand direction will be one-fourth of that at the time the application was initiated. In such case, with fluid at eighty pound per square inch pressure in chamber 69, the relay valve device 11 is operative to effect a reduction of the pressure in the brake cylinder 10 to a value which may be fifty pounds per square inch, as compared to the forty pounds per square inch due solely to the pressure in the chamber 69.

As the vehicle or train continues to reduce in speed due to the application of the brakes, it will be apparent that a point will be reached at which the effect of the force exerted by the centrifuge device will be negligible, such a point conceivably occurring at a speed of, for example twenty-five miles per hour. At this time, therefore, the pressure established in the brake cylinder 10 will be that due substantially only to the pressure established in the chamber 69 and thus, under the assumed conditions, a pressure of approximately forty pounds per square inch will be established in the brake cylinder.

When the vehicle or train comes to a complete stop, the brake valve handle 99 being allowed to remain in its application position, the centrifuge 14 exerts no force on the plunger 49 and consequently the pressure established in the brake cylinder is that due solely to the pressure in the chamber 69, which is substantially forty pounds per square inch.

To effect release of the brakes before again starting the vehicle or train, the operator merely shifts the brake valve handle 99 to its release position and thus exhausts fluid under pressure from the chamber 69 and the connected chamber 71. Accordingly, the valve portion of the relay valve device 11 operates in the manner previously described for a reduction of the force urging the plunger 49 in the left-hand direction to effect the complete exhaust of fluid under pressure from the brake cylinder 10 and consequently the complete release of the brakes. When the pressure in the brake cylinder 10 reduces sufficiently, the spring 126 becomes effective to disengage the friction wheel 119 from the friction wheel 118 on the wheel axle 116 and accordingly when the vehicle again is in motion, the centrifuge 14 is not operated.

It will be apparent that the operator may vary the pressure in the chamber 69 at any time during an application of the brakes, to correspondingly vary the degree of the pressure established in the brake cylinder 10, by merely shifting the brake valve handle 13 away from or toward its normal release position, the pressure in the brake cylinder 10 being correspondingly increased or decreased, respectively.

Summary

Summarizing, it will be seen that I have disclosed a novel brake equipment, for a vehicle or train of cars, comprising essentially a fluid pressure operated self-lapping relay valve device controlling brake cylinder pressure and a centrifuge device operated according to the speed of the vehicle or train to exert an operating force on the relay valve device in addition to that of the operating fluid pressure under the control of the operator. By this arrangement, that is simultaneous manual control of a relay valve device by the operator and automatic control according to the speed of the vehicle, the operator may select a desired degree of application and this degree will be automatically reduced as the speed of the vehicle reduces, thereby preventing excessive application of the brakes at the lower speeds and thereby preventing sliding of the vehicle wheels. A clutch arrangement between the centrifuge and a wheel axle is provided for preventing operation of the relay valve device by the centrifuge 14 except during an application of the brakes.

While I have shown a direct connection between the movable elements of the centrifuge and the force applying diaphragm of the relay valve device so that the force exerted by the centrifuge varies as the square of the speed, it will be apparent that intervening cam mechanism may be provided between the centrifuge and the actuating lever for the relay valve device so that the variation in the force applied by the centrifuge device may be according to a straight-line or other suitable relation to the variation in the vehicle speed, if desired. It will also be apparent that various other modifications, omissions or additions may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. A vehicle brake equipment comprising a brake cylinder, a self-lapping valve mechanism including a movable abutment subject in opposing relation to a control fluid pressure and to brake cylinder pressure, said valve mechanism being operative in response to the control fluid pressure acting on the abutment to establish a fluid pressure in the brake cylinder corresponding to said control pressure, a second abutment unconnected with the first said abutment and movable in a direction to exert a force on the first said abutment supplementing that of the control fluid pressure, and means controlled by the speed of the vehicle for effecting movement of said second abutment in said direction.

2. A control valve device comprising a first chamber and a second chamber, valve mechanism operative in response to the pressure of fluid in said second chamber for establishing a corresponding fluid pressure in said first chamber, and movable abutment means subject in balanced relation to the fluid pressure in said second chamber and shiftable in a direction to supplement the effect of the fluid pressure in said second chamber for controlling the operation of the valve mechanism.

3. In combination, a control valve device comprising a first chamber and a second chamber, valve mechanism operative in response to the pressure of fluid in said second chamber for establishing a corresponding fluid pressure in the first said chamber, movable abutment means subject in balanced relation to the fluid pressure in said second chamber and shiftable in a direction to supplement the effect of the fluid pressure in the said second chamber for controlling the operation of the valve mechanism, and automatically controlled means for shifting said movable abutment in said direction.

4. A vehicle brake equipment comprising a brake cylinder, valve mechanism having a chamber and operative in response to the pressure of fluid in said chamber for establishing a corresponding fluid pressure in the brake cylinder, movable abutment means subject in balanced relation to the fluid pressure in said chamber and shiftable in a direction to supplement the effect of the fluid pressure in the said chamber for controlling the operation of the valve mechanism, and a centrifuge device operative according to the speed of the vehicle for shifting said abutment in said direction.

5. Vehicle brake apparatus comprising a brake cylinder, self-lapping valve means having an operating abutment subject in opposing relation to a control fluid pressure and to brake cylinder pressure for controlling the pressure in the brake cylinder according to the control fluid pressure, a pair of abutments of equal effective pressure areas arranged in coaxial spaced relation to each other, a rigid element connecting said pair of abutments, said pair of abutments being subject in balanced relation on the outer faces thereof to the control fluid pressure, a lever associated with said element at a point between said pair of abutments and operative to move the pair of abutments in a direction to exert a force on said operating abutment in the same direction as the force of the control fluid pressure, and a centrifuge device operative according to the speed of rotation of a vehicle wheel for exerting a moving force on said lever varying with the speed of rotation of the vehicle wheel.

CLYDE C. FARMER.